United States Patent
Chakladar et al.

(10) Patent No.: US 11,393,472 B2
(45) Date of Patent: *Jul. 19, 2022

(54) METHOD AND APPARATUS FOR EXECUTING VOICE COMMAND IN ELECTRONIC DEVICE

(71) Applicant: Samsung Electronics Co., Ltd., Gyeonggi-do (KR)

(72) Inventors: Subhojit Chakladar, Gyeonggi-do (KR); Sang-Hoon Lee, Gyeonggi-do (KR); Hee-Woon Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

This patent is subject to a terminal disclaimer.

(21) Appl. No.: 16/876,225

(22) Filed: May 18, 2020

(65) Prior Publication Data

US 2020/0279563 A1 Sep. 3, 2020

Related U.S. Application Data

(63) Continuation of application No. 16/149,304, filed on Oct. 2, 2018, now Pat. No. 10,657,967, which is a (Continued)

(30) Foreign Application Priority Data

May 29, 2012 (KR) ........................ 10-2012-0057044

(51) Int. Cl.
*G10L 15/22* (2006.01)
*G10L 15/26* (2006.01)
*G06F 3/16* (2006.01)

(52) U.S. Cl.
CPC .............. *G10L 15/22* (2013.01); *G06F 3/167* (2013.01); *G10L 15/26* (2013.01); *G10L 2015/223* (2013.01); *G10L 2015/225* (2013.01)

(58) Field of Classification Search
CPC ... G10L 15/22; G10L 15/26; G10L 2015/223; G10L 2015/225; G10L 15/30; G10L 15/06; G10L 17/00; G06F 3/167; H04M 1/72403
See application file for complete search history.

(56) References Cited

U.S. PATENT DOCUMENTS 5,165,095 A 11/1992 Borcherding
5,345,538 A 9/1994 Narayannan et al.
(Continued)

FOREIGN PATENT DOCUMENTS

CN 1351745 A 5/2002
CN 1882146 A 12/2006
(Continued)

OTHER PUBLICATIONS

Dr. E. Chandra et al.; A Review on Speech and Speaker Authentication System Using Voice Signal Feature Selection and Extraction; 2009; IEEE International Advance Computing Conference, pp. 1341-1346.

(Continued)

*Primary Examiner* — Fariba Sirjani
(74) *Attorney, Agent, or Firm* — Cha & Reiter, LLC

(57) ABSTRACT

An apparatus and method for executing a voice command in an electronic device. In an exemplary embodiment, a voice signal is detected and speech thereof is recognized. When the recognized speech contains a wakeup command, a voice command mode is activated, and a signal containing at least a portion of the detected voice signal is transmitted to a server. The server generates a control signal or a result signal (Continued)

corresponding to the voice command, and transmits the same to the electronic device. The device receives and processes the control or result signal, and awakens. Thereby, voice commands are executed without the need for the user to physically touch the electronic device.

17 Claims, 10 Drawing Sheets

Related U.S. Application Data continuation of application No. 15/433,196, filed on Feb. 15, 2017, now abandoned, which is a continuation of application No. 13/903,345, filed on May 28, 2013, now Pat. No. 9,619,200.

(56) References Cited

U.S. PATENT DOCUMENTS

| | | | |
|---|---|---|---|
| 5,428,707 A | 6/1995 | Gould et al. | |
| 5,668,929 A | 9/1997 | Foster, Jr. | |
| 5,704,009 A | 12/1997 | Cline et al. | |
| 5,983,186 A | 11/1999 | Miyazawa et al. | |
| 6,047,255 A | 4/2000 | Williamson | |
| 6,070,140 A | 5/2000 | Tran | |
| 6,092,044 A | 7/2000 | Baker et al. | |
| 6,145,083 A | 11/2000 | Shaffer et al. | |
| 6,208,971 B1 * | 3/2001 | Bellegarda | G10L 15/1822 |
| | | | 704/275 |
| 6,266,635 B1 | 7/2001 | Sneh | |
| 6,347,299 B1 | 2/2002 | Holzman et al. | |
| 6,411,926 B1 | 6/2002 | Chang | |
| 6,415,257 B1 | 7/2002 | Junqua et al. | |
| 6,466,654 B1 | 10/2002 | Cooper et al. | |
| 6,487,534 B1 | 11/2002 | Thelen et al. | |
| 6,529,875 B1 | 3/2003 | Nakajima et al. | |
| 6,941,265 B2 | 9/2005 | Bi et al. | |
| 6,959,279 B1 | 10/2005 | Jackson et al. | |
| 6,965,786 B2 | 11/2005 | Qu et al. | |
| 6,965,863 B1 | 11/2005 | Zuberec et al. | |
| 6,985,865 B1 | 1/2006 | Packingham et al. | |
| 7,313,525 B1 | 12/2007 | Packingham et al. | |
| 7,684,766 B2 | 3/2010 | Lim | |
| 8,217,251 B2 | 7/2012 | Anderson | |
| 8,666,446 B2 | 3/2014 | Kim | |
| 8,667,562 B2 | 3/2014 | LeBeau et al. | |
| 8,886,545 B2 | 11/2014 | Meisel et al. | |
| 9,262,612 B2 * | 2/2016 | Cheyer | H04L 63/10 |
| 9,753,552 B1 | 9/2017 | White et al. | |
| 2002/0049589 A1 | 4/2002 | Poirier | |
| 2002/0065654 A1 | 5/2002 | Grant et al. | |
| 2002/0116185 A1 | 8/2002 | Cooper et al. | |
| 2002/0164000 A1 | 11/2002 | Cohen et al. | |
| 2002/0194003 A1 | 12/2002 | Mozer | |
| 2003/0055535 A1 | 3/2003 | Voeller et al. | |
| 2003/0171929 A1 | 9/2003 | Falcon et al. | |
| 2004/0259542 A1 | 12/2004 | Viitamaki et al. | |
| 2005/0131677 A1 | 6/2005 | Assadollahi | |
| 2005/0216271 A1 | 9/2005 | Konig | |
| 2005/0275558 A1 | 12/2005 | Papadimitriou et al. | |
| 2006/0020471 A1 | 1/2006 | Ju et al. | |
| 2006/0074658 A1 | 4/2006 | Chadha | |
| 2006/0164205 A1 | 7/2006 | Buckingham et al. | |
| 2006/0200347 A1 | 9/2006 | Kim et al. | |
| 2006/0206326 A1 | 9/2006 | Fukada | |
| 2006/0281495 A1 | 12/2006 | Yang | |
| 2007/0073718 A1 | 3/2007 | Ramer et al. | |
| 2007/0150288 A1 | 6/2007 | Wang et al. | |
| 2007/0174388 A1 | 7/2007 | Williams | |
| 2007/0201639 A1 | 8/2007 | Park et al. | |
| 2007/0281748 A1 | 12/2007 | Piekarski | |
| 2007/0281761 A1 | 12/2007 | Kim | |
| 2008/0004882 A1 | 1/2008 | Papadimitriou et al. | |
| 2008/0046250 A1 | 2/2008 | Agapi et al. | |
| 2008/0071547 A1 | 3/2008 | Prieto et al. | |
| 2008/0082338 A1 | 4/2008 | O'Neil et al. | |
| 2008/0140413 A1 | 6/2008 | Millman et al. | |
| 2008/0167860 A1 | 7/2008 | Goller et al. | |
| 2009/0149127 A1 | 6/2009 | Viitamaki et al. | |
| 2009/0204410 A1 * | 8/2009 | Mozer | G10L 15/30 |
| | | | 704/275 |
| 2009/0210233 A1 | 8/2009 | Thompson, III et al. | |
| 2009/0313014 A1 | 12/2009 | Shin | |
| 2010/0026815 A1 | 2/2010 | Yamamoto | |
| 2010/0030400 A1 | 2/2010 | Komer et al. | |
| 2010/0041447 A1 | 2/2010 | Graylin | |
| 2010/0185448 A1 | 7/2010 | Meisel | |
| 2010/0274563 A1 | 10/2010 | Malo et al. | |
| 2010/0318357 A1 | 12/2010 | Istvan et al. | |
| 2011/0054900 A1 | 3/2011 | Phillips et al. | |
| 2011/0087491 A1 | 4/2011 | Wittenstein et al. | |
| 2011/0088086 A1 | 4/2011 | Swink et al. | |
| 2011/0208520 A1 | 8/2011 | Lee | |
| 2011/0264452 A1 | 10/2011 | Venkataramu et al. | |
| 2011/0301943 A1 | 12/2011 | Patch | |
| 2012/0004910 A1 | 1/2012 | Quidilig et al. | |
| 2012/0029379 A1 | 2/2012 | Sivadas | |
| 2012/0036556 A1 | 2/2012 | LeBeau et al. | |
| 2012/0052907 A1 | 3/2012 | Gilbreath et al. | |
| 2012/0133484 A1 | 5/2012 | Griffin | |
| 2012/0226502 A1 | 9/2012 | Ouchi et al. | |
| 2012/0245941 A1 * | 9/2012 | Cheyer | G10L 17/24 |
| | | | 704/E15.004 |
| 2013/0080167 A1 | 3/2013 | Mozer | |
| 2013/0082937 A1 | 4/2013 | Liu et al. | |
| 2013/0093445 A1 | 4/2013 | Newman | |
| 2013/0124207 A1 | 5/2013 | Sarin et al. | |
| 2013/0176108 A1 | 7/2013 | Madhani et al. | |
| 2013/0190043 A1 | 7/2013 | Kulas | |
| 2013/0289994 A1 | 10/2013 | Newman et al. | |
| 2013/0325484 A1 | 12/2013 | Chakladar et al. | |
| 2013/0332885 A1 | 12/2013 | Ji et al. | |
| 2014/0189801 A1 | 7/2014 | Rokusek et al. | |
| 2014/0316776 A1 | 10/2014 | Lee et al. | |
| 2015/0042572 A1 | 2/2015 | Lombardi et al. | |
| 2016/0133259 A1 | 5/2016 | Rubin et al. | |

FOREIGN PATENT DOCUMENTS

| | | |
|---|---|---|
| CN | 103456306 A | 12/2013 |
| KR | 10-2006-0097895 A | 9/2006 |
| KR | 10-2009-0123396 A | 12/2009 |
| KR | 10-2010-0027865 A | 3/2010 |
| KR | 10-2011-0061267 A | 6/2011 |
| WO | 00/58942 A2 | 10/2000 |
| WO | 2010/075623 A1 | 7/2010 |

OTHER PUBLICATIONS

"Full Hands-On With Samsung's S Voice From The Galaxy S III" http://www.androidpolice.com/2012/05/20/full-hands-on-with-samsungs-s-voice-for-the-galaxy-s-iii/.

* cited by examiner

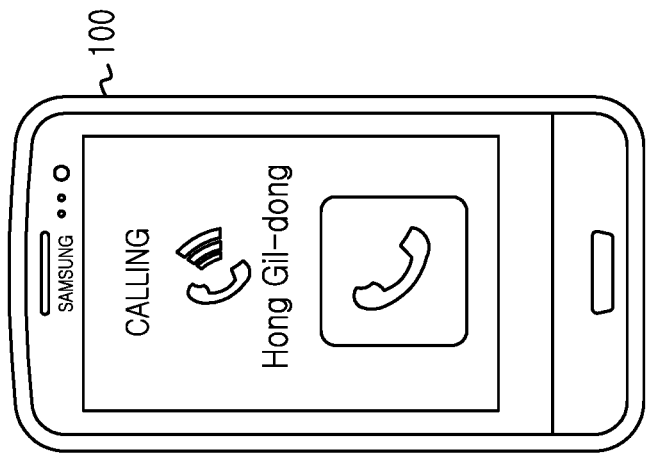
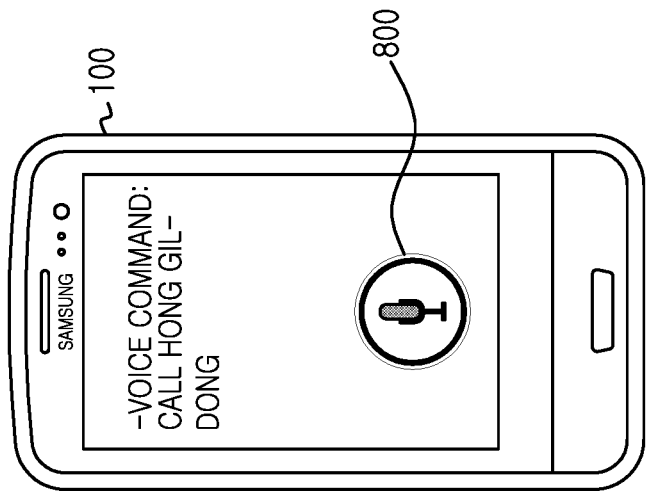
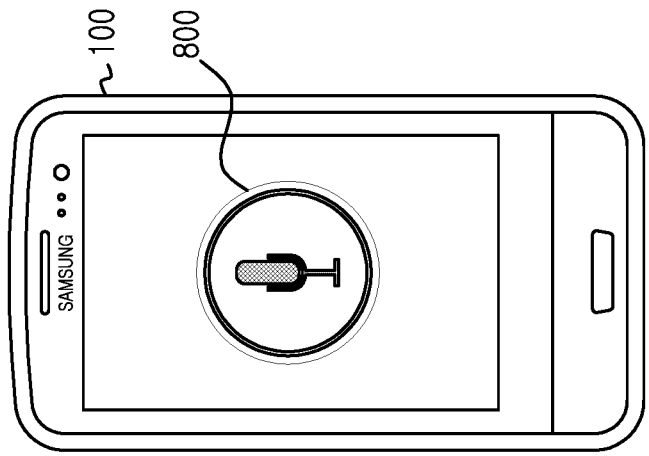

METHOD AND APPARATUS FOR EXECUTING VOICE COMMAND IN ELECTRONIC DEVICE

CROSS REFERENCE TO RELATED APPLICATIONS

The present application is a Continuation of U.S. patent application Ser. No. 16/149,304 filed on Oct. 2, 2018, which is a Continuation of the earlier U.S. patent application Ser. No. 15/433,196 filed on Feb. 15, 2017 which claims the benefit of the earlier U.S. patent application Ser. No. 13/903, 345 filed on May 28, 2013 and assigned U.S. Pat. No. 9,619,200 issued on Apr. 11, 2017 which claims the benefit under 35 U.S.C. § 119(a) to a Korean patent application filed in the Korean Intellectual Property Office on May 29, 2012, and assigned Serial No. 10-2012-0057044, the entire disclosure of which is hereby incorporated by reference.

TECHNICAL FIELD

The present disclosure relates generally to an electronic device. More particularly, the present disclosure relates to an apparatus and a method for executing a voice command in an electronic device.

BACKGROUND

In recent times, as multimedia technologies have grown, electronic devices having multiple functions have proliferated. Examples of such multi-function devices include portable terminals such as smart phones, tablet PCs, smart cameras, as well as fixed home-based devices such as electronic devices integrated with home kitchen appliances. The electronic devices mostly include a convergence function which combines a number of functions.

Portable terminal designers strive to achieve advanced performance as well as the convergence function, as well as slim and aesthetic designs of the device as a whole. Terminal manufacturers compete to present substantially the same or advanced performance and to engineer new models that are smaller and slimmer than prior designs.

Among the various functions available, a recently commercialized device provides a voice recognition function of relatively high accuracy. Such a voice recognition function accurately recognizes a user's voice to easily execute a corresponding function of the device without having to press a separate button or touch a key or touchscreen.

For example, the voice recognition function allows the user to make a call or write a text message without separate manipulation in a portable terminal such as a smart phone, to send the generated message, and to easily set various functions such as a route planner, Internet search, and alarm.

To execute the voice recognition function, the related art drives a corresponding voice recognition application, activates the voice recognition function, and then performs the corresponding function.

However, to perform the voice recognition, the voice recognition application is initially started in response to a touch input command on a separate key or the touchscreen. This operation goes against the unique function of the voice recognition for facilitating data input without touch. Further, launching the voice recognition application requires finding it in a display screen including various application objects, which may be difficult and time consuming in some circumstances.

SUMMARY

Embodiments of apparatus and methods for executing a voice command in an electronic device are disclosed. In an exemplary embodiment, a voice signal is detected and speech thereof is recognized. When the recognized speech contains a wakeup command, a voice command mode is activated, and a signal containing at least a portion of the detected voice signal is transmitted to a server. The server generates a control signal or a result signal corresponding to the voice command, and transmits the same back to the electronic device. The device receives and processes the control or result signal, and awakens. Thereby, voice commands are executed without the need for the user to physically touch the electronic device.

In various embodiments:

The voice signal may comprise the wakeup command followed by the voice command.

The wakeup command may also comprise the voice command.

A silence duration may be determined between the wakeup command and the voice command.

Processing the control signal or the result signal may comprise executing a particular application of the electronic device.

Processing of the control signal or the result signal may comprise displaying data corresponding to the result signal.

Once the voice command mode is activated, an object may be activated on a display indicative of the voice command mode being activated.

When a screen is locked prior to recognizing the wakeup command in the speech, the screen may be unlocked responsive to the recognized wakeup command.

The speech may be recognized to contain a predetermined wakeup command only if a predetermined speaker of the voice signal is recognized. The wakeup command may be detected automatically when the voice of the predetermined speaker is recognized.

Alternatively, the wakeup command may be detected when the voice of the predetermined speaker is recognized and a predetermined wakeup command is recognized within the speech of the predetermined speaker. In another embodiment, a method for executing a voice command in an electronic device, comprises: detecting a voice signal which contains at least one of a wakeup command and a voice command; transmitting the voice signal to a server; awakening the electronic device upon receiving a result signal indicative of the server detecting the wakeup command in the voice signal; receiving a control signal or a result signal corresponding to the voice command from the server; and processing the control signal or the result signal corresponding to the voice command.

In an embodiment, a method operable in a server, for supporting a voice command of an electronic device, comprises: receiving a transmitted voice signal which contains at least a voice command, from the electronic device; generating a control signal or a result signal corresponding to the voice command by recognizing and analyzing the voice command; and sending the control signal or the result signal corresponding to the first voice command, to the electronic device.

In an embodiment, an electronic device comprises: one or more processors; a memory; and one or more programs stored in the memory and configured for execution by the one or more processors, wherein the program comprises instructions for detecting a voice signal and recognizing speech thereof; when the speech is recognized to contain a wakeup command, activating a voice command mode and transmitting a transmit signal containing at least a portion of the detected voice signal to a server; and receiving and processing a control signal or a result signal generated and transmitted by the server in response to a voice command within the transmit signal recognized by the server.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 8A, FIG. 8B and FIG. 8C illustrate a dialing based on the voice signal including the wakeup command and the voice command according to an exemplary embodiment of the present invention.

Throughout the drawings, like reference numerals will be understood to refer to like parts, components and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide an apparatus and a method for executing a voice command in an electronic device and a server.

Figure 1A:
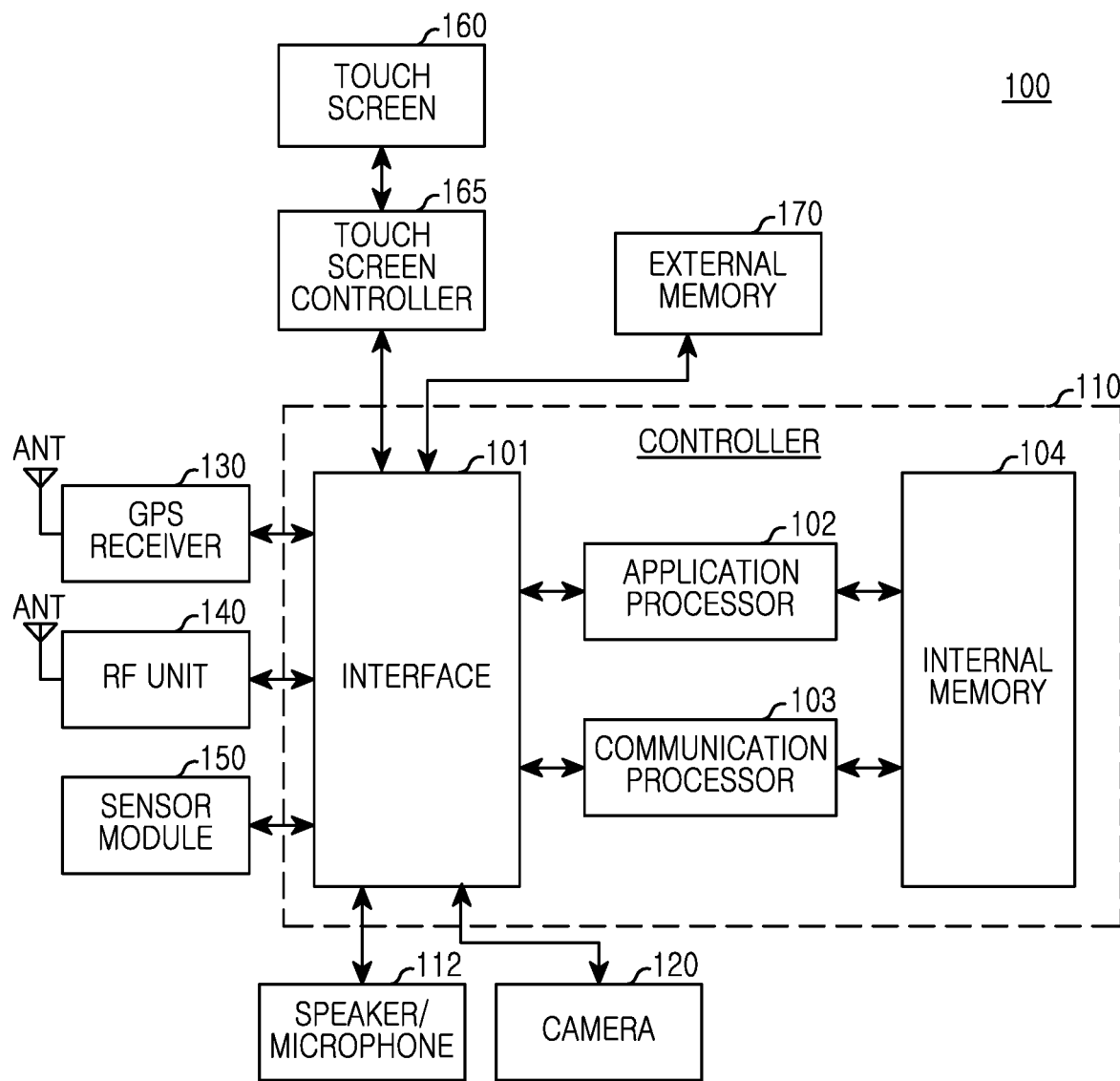
FIG. 1A is a block diagram of an electronic device for executing a voice command according to an exemplary embodiment of the present invention.

FIG. 1A depicts an electronic device 100 for executing a voice command according to an exemplary embodiment of the present invention. Electronic device 100 can be any one of a variety of fixed or portable devices. A portable device can be a portable terminal, mobile terminal, mobile pad, media player, tablet computer, smart phone, a notebook/desktop computer, a Personal Digital Assistant (PDA), a smart camera, and so forth. The electronic device may be a portable electronic device combining two or more functions of those devices. An example of a fixed electronic device is an electronic display device attached to a home appliance such as a kitchen appliance.

Electronic device 100 can include a controller 110, a speaker/microphone 112, a camera 120, a Global Positioning System (GPS) receiver 130, a Radio Frequency (RF) unit 140, a sensor module 150, a touch screen 160, a touch screen controller 165, and an external memory 170.

Briefly, according to embodiments of the invention, device 100 detects a voice signal and recognizes speech in the detected signal. When the speech is recognized to contain a wakeup command, device 100 activates a voice command mode. In the voice command mode, device 100 is able to respond to subsequent voice commands. Thus, if the device is in a locked screen state or an idle state (or in both of these states if conditions allow), the device can be awakened through the wakeup command recognition without the need for the user to physically touch a key or touchscreen on the device 100. Once the wakeup command is detected, a speech recognition process is performed to discern if a voice command has been uttered. If a voice command is recognized, the device 100 can then perform an operation associated with that command.

In one embodiment, both the wakeup command detection and the voice command recognition are performed in the device 100. In another embodiment, the wakeup command detection is performed at device 100 and the voice command recognition is performed at a server, following a transmission of a portion of the voice signal from the device 100 to the server. In still another embodiment, both the wakeup command detection and the voice command detection are performed at the server.

The controller 100 can include an interface 101, one or more processors 102 and 103, and an internal memory 104.

In some cases, the whole controller 110 may be referred to as the processor. The interface 101, the application processor 102, the communication processor 103, and the internal memory 104 can be separate components or integrated onto one or more integrated circuits.

The application processor 102 performs various functions for the electronic device by running various software programs and the communication processor 103 processes and controls voice communication and data communication. In addition to those typical functions, the processors 102 and 103 also execute a particular software module (instruction set) stored in the external memory 170 or the internal memory 104 and conduct particular functions corresponding to the module. That is, the processors 102 and 103 carry out the method of the present invention in association with software modules stored in the external memory 170 or the internal memory 104.

According to one exemplary embodiment of the present invention (corresponding to the method of FIG. 2) the application processor 102 receives a voice signal including a wakeup command and a subsequent voice command from a user through the microphone 110, and performs speech recognition on the voice signal to detect the presence of the wakeup command. When the wakeup command is detected, the application processor 102 may detect a silence duration between the wakeup command and the subsequent voice command in the voice signal. Thus the application processor 102 determines whether the portion of the voice signal corresponding to the voice command begins, and when it does, the application processor 102 sends that portion of the voice signal to a server. Next, the application processor 102 receives a voice recognition result corresponding to the voice command from the server and performs a corresponding operation based on this result.

According to another exemplary embodiment of the present invention (corresponding to the method of FIG. 4), the application processor 102 sends to the server all of the voice signal including the wakeup command portion and the voice command portion, and receives a speaker verification result corresponding to the wakeup command from the server. When the result indicates that the wakeup command is detected, the application processor 102 activates the system. Next, the application processor 102 receives a voice recognition result corresponding to the voice command and performs the operation based on the voice recognition result.

According to yet another exemplary embodiment of the present invention (corresponding to the method of FIG. 6), the application processor 102 receives the voice signal including the wakeup command and the voice command from the user through the microphone 110, and performs the wakeup command detection using speech recognition. When the wakeup command is detected, the application processor 102 uses a voice recognition algorithm to recognize a voice command in a subsequent portion of the voice signal and performs the corresponding operation based on the recognized voice command.

One or more voice recognition processors and a speaker verification processor can be a part of the application processor 102, or can be provided as separate processors. The voice recognition processor and the speaker verification processor may be unified, and include a plurality of processors for different functions according to their implementation. The interface 101 interconnects the touch screen controller 165 of the electronic device with the external or internal memory 170 or 104.

The sensor module 150 is coupled to the interface 101 to allow various functions. For example, a motion sensor and an optical sensor can be coupled to the interface 101 to detect a motion of the electronic device or to detect the light from the outside. Besides these, other sensors such as position determining system, temperature sensor, or biometric sensor can be connected to the interface 101 to conduct relevant functions.

The camera 120 is coupled to the sensor module 150 through the interface 101 to perform a camera function such as photo and video clip recording.

The RF unit 140, which may include at least one processor, performs a communication function. For example, under control of the communication processor 103, the RF unit 140 converts an RF signal to a baseband signal and provides the baseband signal to the communication processor 103, or converts a baseband signal output from the communication processor 103 to an RF signal and transmits the RF signal through an antenna ANT. Here, the communication processor 103 processes the baseband signal according to various communication schemes. For example, the communication scheme can include, but not limited to, a Global System for Mobile communication (GSM) communication scheme, an Enhanced Data GSM Environment (EDGE) communication scheme, a Code Division Multiple Access (CDMA) communication scheme, a W-CDMA communication scheme, a Long Term Evolution (LTE) communication scheme, an Orthogonal Frequency Division Multiple Access (OFDMA) communication scheme, a Wireless Fidelity (Wi-Fi) communication scheme, a WiMax communication scheme, and/or a Bluetooth communication scheme.

The speaker/microphone 110 can input and output an audio signal such as one for voice recognition (used during a training process to train device 100 to recognize a particular speaker and/or wakeup command and/or voice command), voice reproduction, digital recording, and telephone function. That is, the speaker/microphone 110 converts the voice signal to an electric signal or converts the electric signal to the voice signal. An attachable and detachable earphone, headphone, or headset (not shown) can be connected to the electronic device through an external port.

The touch screen controller 165 can be coupled to the touch screen 160. The touch screen 160 and the touch screen controller 165 can detect the touch and the motion or their cessation using, but not limited to, capacitive, resistive, infrared and surface sound wave techniques for determining one or more touch points with the touch screen 160 and a multi-touch detection technique including various proximity sensor arrays or other elements.

The touch screen 160 provides an input/output interface between the electronic device and the user. That is, the touch screen 160 forwards a user's touch input to electronic device 100. The touch screen 160 also presents an output of device 100 to the user. That is, the touch screen 160 presents a visual output to the user. Here, the visual output can be represented as text, graphic, video, and a combination of these.

The touch screen 160 can employ various displays, examples of which include, but are not limited to, Liquid Crystal Display (LCD), Light Emitting Diode (LED), Light emitting Polymer Display (LPD), Organic LED (OLED), Active Matrix OLED (AMOLED) or Flexible LED (FLED).

The GPS receiver 130 converts a signal received from an "artificial" satellite, to information such as location, speed, or time. For example, a distance between the satellite and the GPS receiver 130 can calculated by multiplying the speed of light by a signal arrival time, and measures the location of the electronic device using the well-known triangulation by obtaining accurate positions and distances of three satellites.

The external memory 170 or the internal memory 104 can include fast random access memory such as one or more magnetic disc storage devices and/or non-volatile memory, one or more optical storage devices, and/or a flash memory (e.g., NAND and NOR).

The external memory 170 or the internal memory 104 stores software. Software components include an operating system software module, a communication software module, a graphic software module, a user interface software module, an MPEG module, a camera software module, and one or more application software modules. Since the module being the software component can be a set of instructions, the module can be referred to as an instruction set. The module may be referred to as a program.

The operating system software includes various software components for controlling general system operations. The control of the general system operations includes, for example, memory management and control, storage hardware (device) control and management, and power control and management. The operating system software may process normal communication between various hardware devices and the software components (modules).

The communication software module allows communication with other electronic devices such as computer, server, and/or portable terminal, through the RF unit 140. The communication software module is configured in a protocol architecture of the corresponding communication scheme.

The graphic software module includes various software components for providing and displaying graphics on the touch screen 160. The term 'graphics' embraces text, webpage, icon, digital image, video, animation, and the like.

The user interface software module includes various software components relating to a user interface. The user interface software module is involved in the status change of the user interface and the condition of the user interface status change.

The camera software module includes camera related software components allowing camera related processes and functions. The application module includes a browser, an e-mail, an instant message, a word processing, keyboard emulation, an address book, a touch list, a widget, Digital Right Management (DRM), voice recognition, voice reproduction, a position determining function, a location based service, and the like. The memories 170 and 104 can include an additional module (instructions) in addition to the above-stated modules. Alternatively, if necessary, some module (instructions) may not be used.

Herein, the application module includes an instruction for carrying out a speaker recognition function or a speech recognition function and a voice command execution function. The instructions according to exemplary embodiments of the present invention correspond to those for executing the operations illustrated in FIGS. 2, 4 and 6.

The various functions of electronic device 100 as mentioned above and to be explained, can be executed in hardware and/or software and/or their combination including one or more signal processing and/or Application Specific Integrated Circuits (ASICs).

Figure 1B:
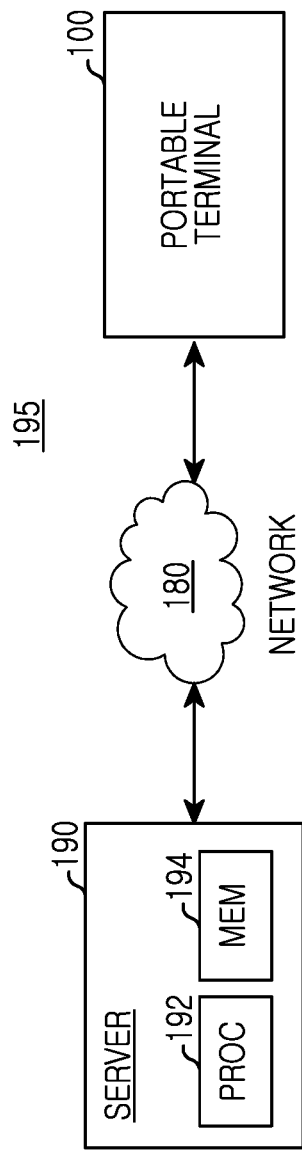
FIG. 1B is a diagram of a system for executing voice commands according to an embodiment.

FIG. 1B illustrates a system 195 for executing voice commands according to an embodiment of the present invention. System 195 includes the portable terminal 100 which communicates with a server 190 through a network 180. Server 190 can be e.g., a home network server, or a remote server accessed through a large network such as the Internet. Alternatively, server 190 can be a third party portable electronic device capable of performing a speech/voice/speaker recognition and analysis function on voice signals transmitted thereto. Server 190 includes a minimum of at least one processor 192 and a memory 194 to perform a host of operations. Exemplary operations of the server 190 in conjunction with electronic device 100 will be described hereafter.

Figure 2:
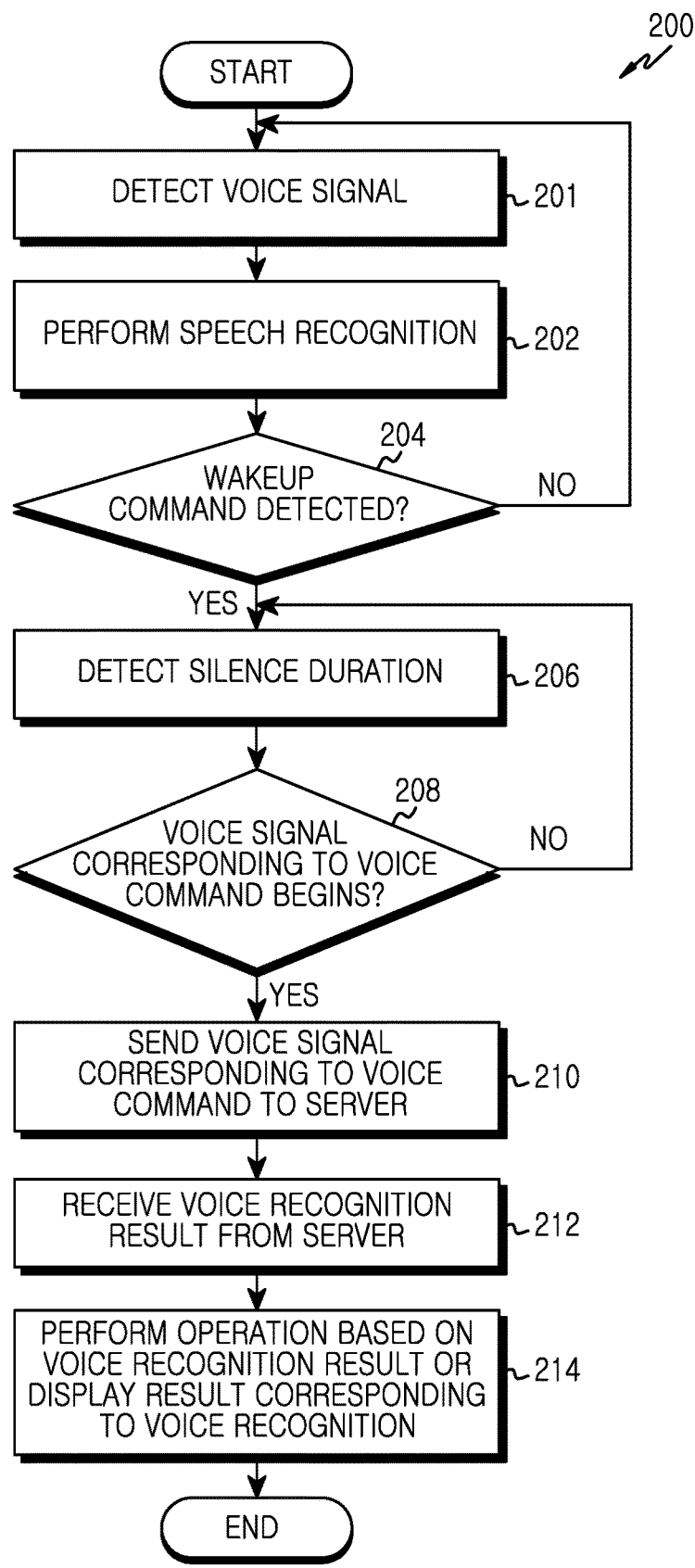
FIG. 2 is a flowchart of a method for executing wakeup and voice commands in an electronic device according to one exemplary embodiment of the present invention.

FIG. 2 is a flowchart of a method 200 for executing wakeup and voice commands in the electronic device 100 according to one exemplary embodiment of the present invention.

At step 201, the electronic device 100 detects a voice signal which may contain the wakeup command and the voice command from the user through the microphone 110. The wakeup command activates a voice command mode of the system, in which no touch contact is required with the touchscreen or a key in order to receive and analyze a voice command. Prior to receiving this voice signal, the device 100 can be in an idle mode or a lockscreen mode. In some embodiments, prior to receiving the voice signal, the device 100 can be in an application execution mode in which no listening for voice commands or operations responsive to voice commands are executed.

In the following description, it will be assumed that the wakeup command is typically independent of a voice command that temporally follows the wakeup command. However, in some "speaker-dependent" embodiments also discussed below, any voice signal detected to be spoken by a predetermined speaker can serve as a wakeup command. In still other embodiments (speaker dependent or speaker independent), the wakeup command also contains an inherent voice command. In the latter case, the wakeup command both activates the voice command mode and is a catalyst for the device 100 to perform an additional predetermined task, such as running a predefined application set by the user.

For example, the wakeup command can instruct to switch to a mode for inputting the voice command ("voice command mode") and/or to unlock the screen. The voice command executes various functions provided by the electronic device 100. For example, the voice command executes dialing, photographing, MP3 playing, and so on. In various implementations, the voice command can request the server 190 to search a map and to plan a route.

In step 202, the electronic device 100 performs speech recognition on the voice signal to discern whether the voice signal contains a predetermined wakeup command. This speech recognition can include a speaker dependent recognition scheme in one embodiment, or a speaker independent recognition scheme in another embodiment. Additional schemes are possible where a number of different wakeup commands are predetermined, in which one or more predetermined commands is a speaker dependent wakeup command and one or more other commands is a speaker independent command.

According to the speaker dependent recognition scheme, a particular speaker or user needs to train a recognizer with his/her own voice in advance. In this case, the speech recognizer can recognize only the speech of the trained voice. The speaker independent recognition scheme can recognize speech of an arbitrary speaker voice. The speaker independent recognition scheme extracts and databases information about hundreds or thousands of voices in advance, and thus any user can use it without a separate training process.

Using the speaker dependent recognition, in some embodiments, the speaker can be verified using the voice command portion of the voice signal (which may comprise the entire voice signal). Hence, there is no need to input a separate wakeup command. For example, when the speaker is verified using unique voice characteristics of the user, there is no need to input the separate wakeup command. Accordingly, in these embodiments, the voice command can also operate as the wakeup command. Thus, in steps 202 and 204, the specific voice of the particular user is recognized, and wakeup command is automatically detected via this recognition.

Alternatively, when using the speaker dependent recognition scheme, a speaker verification is performed based on the information of a voice signal corresponding to a word(s) that is predefined, or set by a user in advance through repeated voice training. The user can train the device 100 to verify the speaker (and a specific wakeup command(s)) by inputting his voice corresponding to a predefined text. In so doing, it is necessary to input the wakeup command. Herein, the predefined text can be input directly by the user or converted by inputting the voice several times. The electronic device 100 or the server 190 can convert the voice to the text.

When the wakeup command is detected in step 204, the method proceeds to step 206. Otherwise, it returns to 201.

Although not illustrated in FIG. 2, when the wakeup command is successfully detected, an "object for recognizing the voice command" is activated on the display in the locked screen (see FIG. 8A). This object, which may be a virtual microphone, indicates activation of the voice command mode, i.e., that the device is actively listening for voice commands. At this time, the object may be firstly displayed, or, displayed in an emphasized manner if a faded version was previously visible, in the locked screen. A Graphical User Interface (GUI) relating to the speech/voice recognition can also be displayed at this time. Alternatively, when the wakeup command is detected, the displayed object can be activated and the GUI relating to the voice recognition can be immediately displayed in the unlocked screen.

In an embodiment variation, when the wakeup command is detected in the idle mode and the screen is locked, the object for recognizing the voice command and the GUI relating to the voice recognition are displayed together. When the screen is not locked, the object for recognizing the voice command and the GUI relating to the voice recognition can also be displayed together.

In step 206, the electronic device 100 detects a silence duration (if one exists) between a first portion of the detected voice signal (hereafter, "first voice signal") corresponding to the wakeup command and a second portion of the detected voice signal (hereafter, "second voice signal") corresponding to the voice command. Of course, this assumes that the voice command is a separate entity than the wakeup command (as mentioned above, an embodiment is possible where the wakeup command is also a voice command). For example, assuming that the wakeup command is "Hi Galaxy" and the voice command is "Call Hong Gil-dong", when the user consecutively pronounces "Hi Galaxy" and "Call Hong Gil-dong", a silence duration exists between "Hi Galaxy" and "Call Hong Gil-dong".

A short pause between two words in the detected speech can be used to detect the start of the voice command. In an embodiment, an extraneous portion of the detected voice signal immediately following the wakeup command can be blocked from being sent to the server together with the ensuing voice command. For doing so, a Voice Activity Detection (VAD) technique can be used. For example, a voice signal typically has more energy than a background noise signal including the "silence" period. However, when background noise is low, unique characteristics of the human voice can be additionally identified. Typically, the unique characteristics of the human voice are identified by observing energy distribution throughout various frequencies. The human voice includes characteristics signature but no noise. Hence, the VAD technique can distinguish speech from a silence period including background noise. Accordingly, in an embodiment, instead of transmitting to the server an audio signal including all sounds detected subsequent to the wakeup command, the device 100 waits until speech is detected, and thereafter transmits only sound signals beginning with the detected speech that follows the wakeup command. That is, the method 200 avoids transmitting signals containing just noise of a silent period following a wakeup command detection.

In step 208, device 100 determines whether the second voice signal corresponding to the voice command begins. For example, device 100 checks the start point of the voice signal corresponding to "Call Hong Gil-dong". When the second voice signal begins, device 100 at step 210 sends the voice signal corresponding to the voice command (e.g., "Call Hong Gil-dong") to the server. (The portion of the voice signal transmitted to the server is variously referred to herein as "the transmit signal.") (When the voice signal corresponding to the voice command does not begin at 208, the flow returns to 206.) Advantageously, by transmitting the voice command to the server, device 100 is freed from the processor intensive task of recognizing the speech of the voice command.

In step 212, device 100 receives the voice recognition result corresponding to the voice command from the server. For example, the server analyzes the voice command "Call Hong Gil-dong", and sends a control signal corresponding to "Call Hong Gil-dong" to device 100 or sends a search result of the route planning request or the map search request.

In step 214, device 100 performs the corresponding operation based on the voice recognition result corresponding to the voice command, or displays a result corresponding to the voice recognition. For example, when receiving the control signal corresponding to "Call Hong Gil-dong" from the server, device 100 searches a phonebook for a phone number of Hong Gil-dong and tries to connect the call with the searched phone number. In the case of the map/route request, device 100 displays the search result of the route planning request or the map search request. Thereafter, the process ends.

Figure 3:
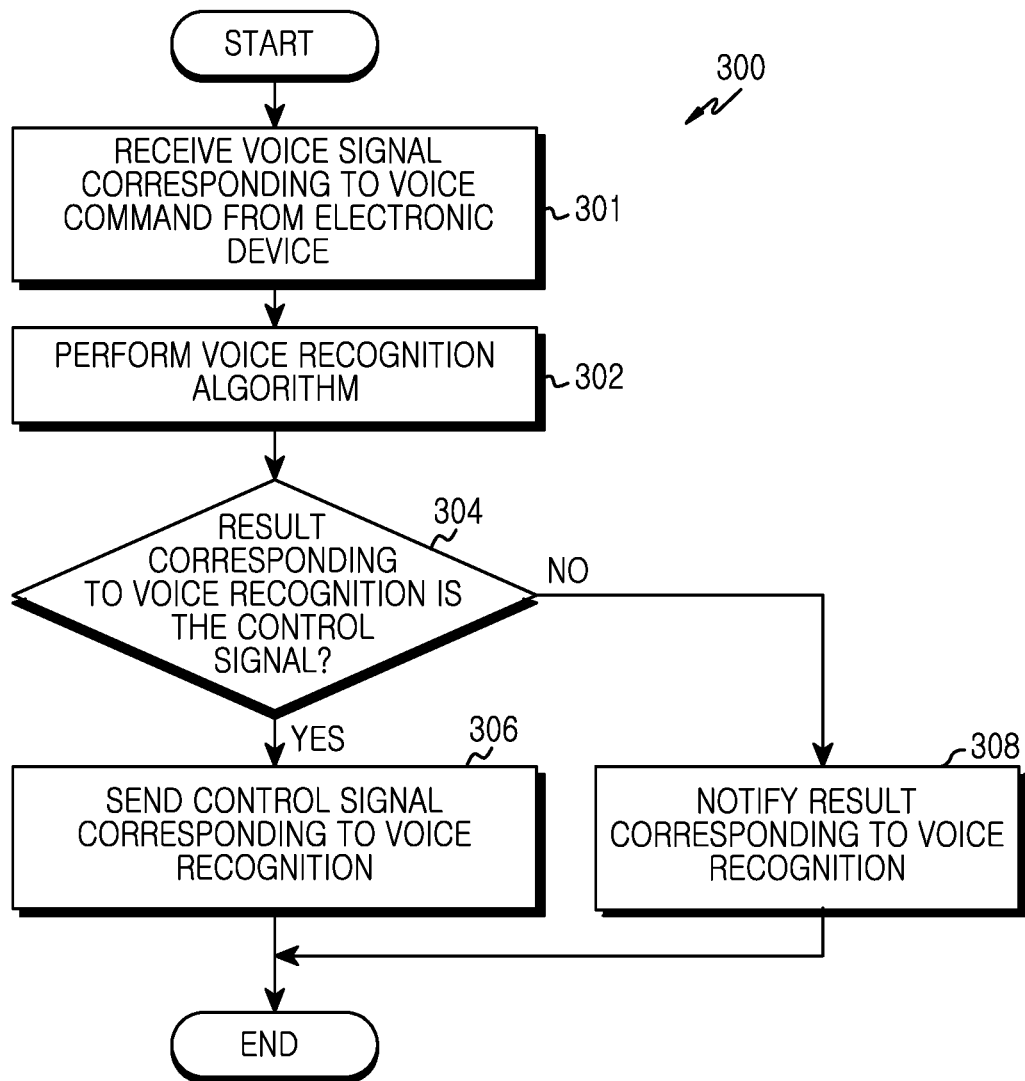
FIG. 3 is a flowchart of a method operable in a server according to one exemplary embodiment of the present invention.

FIG. 3 is a flowchart illustrating a method, 300, performed by server 190 according to one exemplary embodiment of the present invention. This method may complement the operations of the above-described method 200 operating in device 100. In this embodiment, the server receives the transmit signal, i.e., the voice signal corresponding to the voice command (e.g., "Call Hong Gil-dong") from the electronic device (e.g., transmitted at step 210 of FIG. 2) in step 301.

Next, the server analyzes the voice signal corresponding to the voice command using a voice recognition algorithm (equivalently, "speech recognition" algorithm) in step 302. That is, the server analyzes the voice signal to recognize speech and discern a voice command from the recognized speech. The server then determines whether the result corresponding to the voice recognition is a control signal in step 304. If so, the server sends the control signal corresponding to the voice recognition to device 100 in step 306. For example, after recognizing "Call Hong Gil-dong", the server provides the corresponding control signal to device 100 to instruct device 100 to call Hong Gil-dong at an associated phone number extracted from a phone book storage thereof.

When the result corresponding to the voice recognition is not the control signal, the server provides the result corresponding to the voice recognition to the electronic device in step 308. Alternatively, the server sends image content containing the search result of the route planning request or the map search request, whereby the device 100 displays the content.

Accordingly, in the exemplary embodiments of methods 200 and 300, the electronic device fulfills the wakeup command detection and the server fulfills the voice recognition of the voice command. According to another exemplary embodiment of the present invention, the server carries out both of the wakeup command detection and the voice recognition of the voice command.

Figure 4:
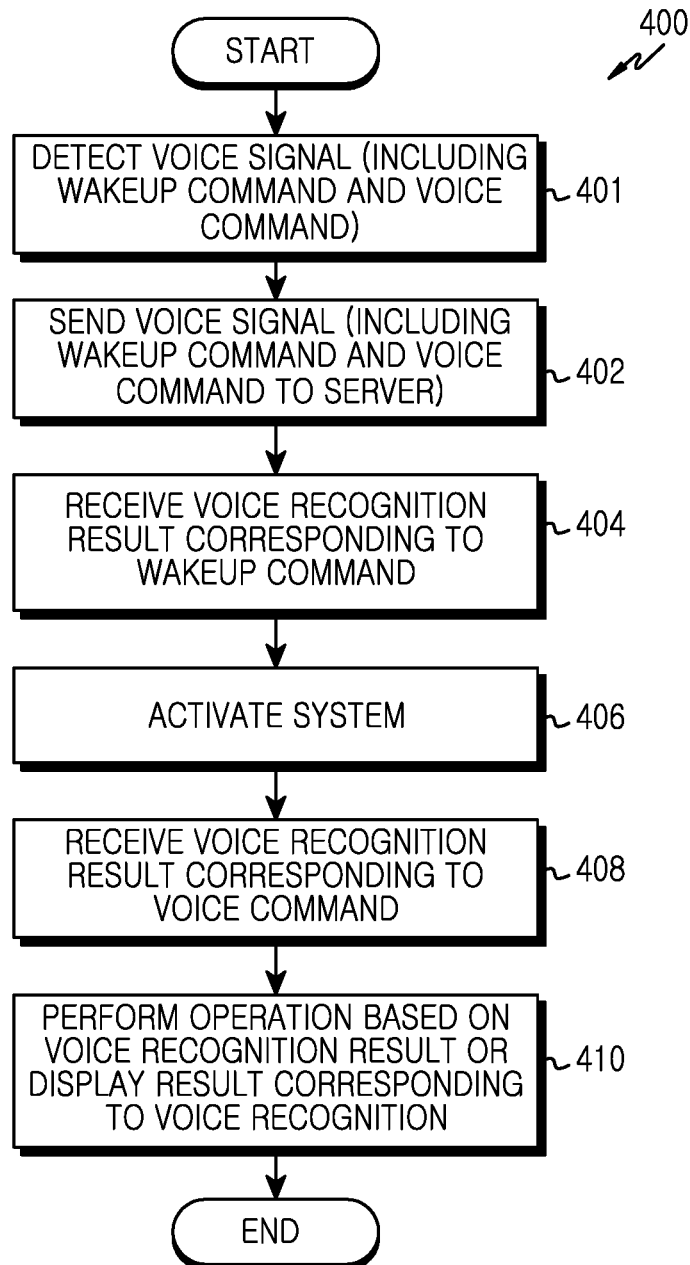
FIG. 4 is a flowchart of method for executing a voice command in an electronic device according to another exemplary embodiment of the present invention.

FIG. 4 is a flowchart of another example method, 400, performed in device 100 according to another exemplary embodiment of the present invention. Here, in an idle mode and/or locked screen mode, device 100 receives a voice signal including the wakeup command followed shortly thereafter (or continuously thereafter) by the voice command from the user through the microphone 110 in step 401. As described earlier, the wakeup command, when recognized, activates the system. For example, the wakeup command can instruct to switch to the mode for inputting the voice command and/or to unlock the screen. The voice command commands execution of various functions provided by the electronic device 100. For example, the voice command executes dialing, photographing, MP3 playing, and so on.

In step 402, device 100 sends the entire voice signal including the wakeup command and the voice command, to the server as the transmit signal. Next, a voice verification result corresponding to the wakeup command is received from the server (step 404). That is, when the server detects that the transmit signal contains the wakeup command, it sends the voice recognition result that is received in step 404; otherwise, the server may not send any recognition signal back to device 100. For example, when device 100 receives the recognition result at step 404, this indicates that the wakeup command was detected, and device 100 activates the system in step 406. The system activation unlocks the screen or switches from the idle mode to an active mode or voice command mode. (With the system activated and in voice command mode, device 100 may subsequently detect new voice signals containing voice commands as in step 401 and repeat steps 402-404 and subsequent steps accordingly.)

Next, device 100 receives the voice recognition result corresponding to the voice command in step 408, and performs the operation based on the voice recognition result or displays the result corresponding to the voice recognition in step 410. For example, when receiving the control signal corresponding to "Call Hong Gil-dong" from the server, device 100 searches the phonebook for the phone number of Hong Gil-dong and tries to connect the call with the searched phone number. In the map/route example, device 100 displays the search result of the route planning request or the map search request. Thereafter, the process ends, and device 100 may receive new voice signals at step 401 and forward these to the server for processing, whereby the server may continue to respond by sending control signals and/or results corresponding to the subsequent voice commands. That is, steps 401 through 410 may be repeated with relevant operations only for the voice commands, but of course not for the wakeup command since the device 100 has already been awakened.

Figure 5:
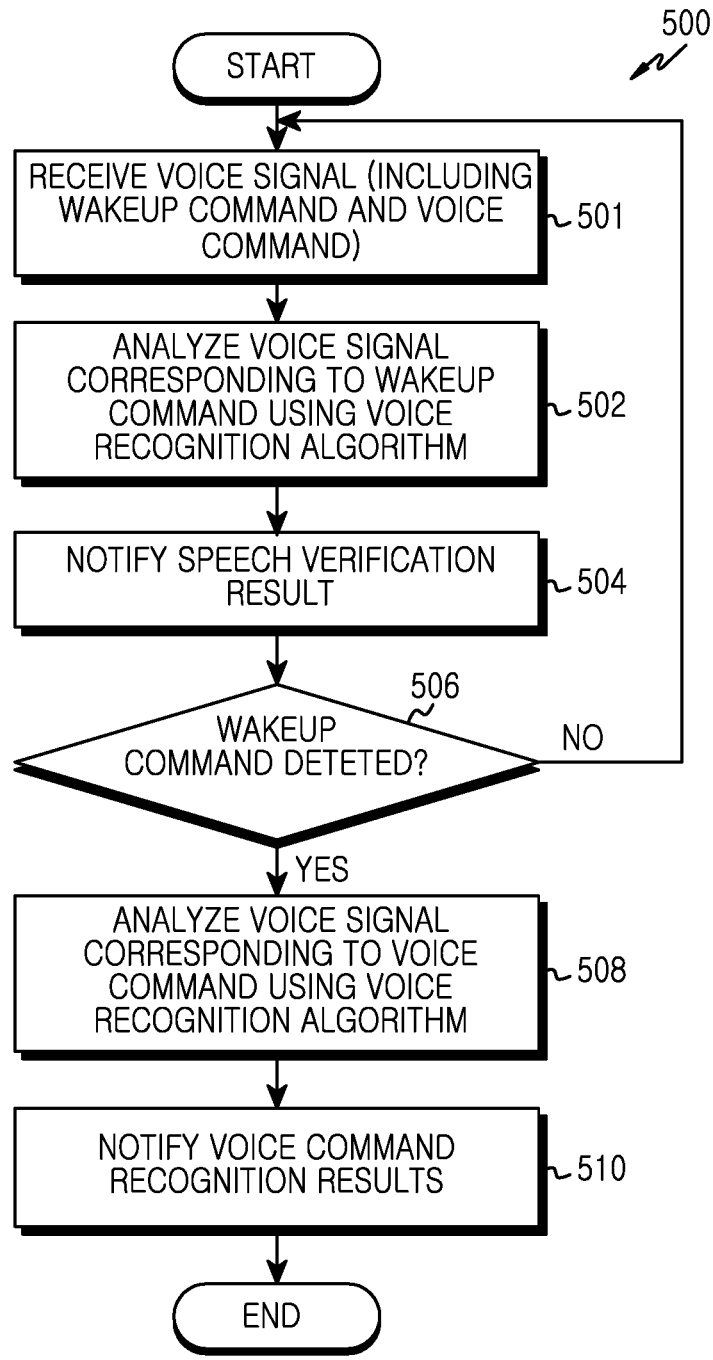
FIG. 5 is a flowchart of another method operable in a server according to another exemplary embodiment of the present invention.

FIG. 5 is a flowchart of an exemplary method 500 performed by server 190 according to another exemplary embodiment of the present invention. This method may complement the operations of the above-described method 400 operating in device 100.

At step 501, the server receives the voice signal including the wakeup command and the voice command from the electronic device 501 (i.e., the transmit signal transmitted at step 402). In step 502, the server analyzes the voice signal corresponding to the wakeup command using the voice recognition algorithm. That is, the server analyzes the voice signal corresponding to the wakeup command and thus determines whether or not the wakeup command is detected. This operation may be the same as that of steps 202 and 204 in FIG. 2 performed by device 100 in that embodiment. Note that a speaker-dependent and/or speaker independent recognition operation may be performed, as in the embodiment of FIG. 2. (Both types of recognition schemes may be employed if multiple predetermined wakeup commands are under consideration.)

In step 504, the server provides a speech verification result to the electronic device. (Note that step 504 may be omitted in other implementations.)

When the wakeup command is detected in step 506 as a result of the speech recognition processing, the server then analyzes the voice signal corresponding to the voice command using the voice recognition algorithm in step 508. That is, the server recognizes the speech corresponding to the voice command, and generates a response signal corresponding to an action to be performed by device 100 for the particularly discerned voice command. By contrast, when the wakeup command is not detected in the voice signal, the flow returns to step 501. To this end, the server may transmit a signal informing device 100 that no wakeup command has been detected, whereby device 100 may continue to transmit to the server newly detected voice signals at step 501. In various implementations, when the voice signal corresponding to the previous voice command is normal, the server can request and receive only the first voice signal corresponding to the wakeup command.

Although not illustrated, the server can detect a silence duration between the voice signal corresponding to the wakeup command and the voice signal corresponding to the voice command, and thus distinguish the wakeup command and the voice command.

In step 510, the server notifies the wakeup command result and the voice recognition result (the response signal) to the electronic device. For example, the server determines whether the wakeup command is detected by analyzing whether the speech contains the phrase "Hi Galaxy", analyzes the voice command "Call Hong Gil-dong", and thus sends the control signal corresponding to "Call Hong Gil-dong" to the electronic device 100.

Next, the server finishes this process, and may be configured to listen for subsequent voice signal transmissions from device 100 as in step 501. To this end, suitable signaling between device 100 and server 190 can be designed to inform server 190 if device 100 has returned to an idle mode or a lock screen mode. If so, the server would treat a subsequently received voice signal as one that may contain the wakeup command. If not, the server would naturally just listen for a new voice command.

Figure 6:
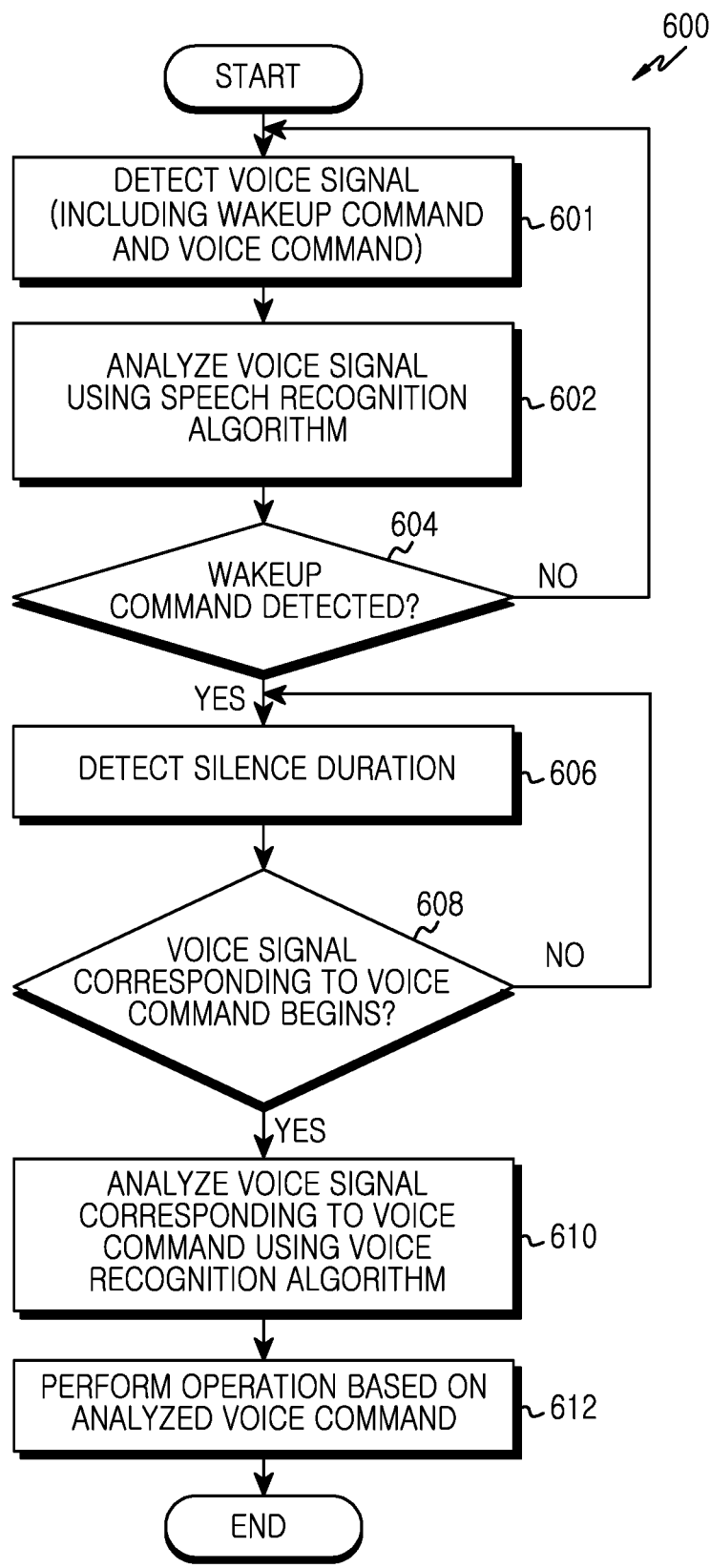
FIG. 6 is a flowchart of a method for executing a voice command in an electronic device according to yet another exemplary embodiment of the present invention.

FIG. 6 is a flowchart depicting operations of an example method, 600, performed by the electronic device according to yet another exemplary embodiment of the present invention. In this embodiment, the electronic device carries out both the wakeup command detection and the voice recognition for the voice commands.

Steps 601, 602, 604, 606 and 608 may be the same as steps 201, 202, 204, 206 and 208, respectively, of FIG. 2. The following description of steps 601-608 reiterates some of the concepts described in connection with steps 201-208.

At step 601, in the idle mode or in the locked screen, the electronic device 100 receives the voice signal including the wakeup command and the voice command from the user through the microphone 110. The wakeup command activates the system. For example, the wakeup command can instruct to switch to the mode for inputting the voice command or to unlock the screen. The voice command executes various functions provided by the electronic device 100. For example, the voice command executes dialing, photographing, MP3 playing, and so on.

In step 602, device 100 analyzes the voice signal using a speech recognition algorithm (voice recognition algorithm) to determine whether the voice signal contains the wakeup command. As explained earlier, if speaker-dependent recognition is employed, this operation may involve merely detecting that the voice matches a predetermined voice, or that the predetermined voice also contains particular speech matching a predetermined wakeup command(s). Alternatively, a speaker-independent recognition scheme may be utilized. When the wakeup command is recognized in step 604, the flow proceeds to step 606; otherwise, it returns to step 600.

In step 606, device 100 detects the silence duration between the voice signal portion corresponding to the wakeup command and the voice signal portion corresponding to the voice command. For example, provided that the wakeup command is "Hi Galaxy" and the voice command is "Call Hong Gil-dong", when the user consecutively pronounces "Hi Galaxy" and "Call Hong Gil-dong", the silence duration lies between "Hi Galaxy" and "Call Hong Gil-dong".

In step 608, the electronic device 100 determines whether the voice signal corresponding to the voice command begins. For example, the electronic device 100 checks the start point of the voice signal corresponding to "Call Hong Gil-dong" in step 608.

When the voice signal corresponding to the voice command begins in step 608, the electronic device 100 analyzes the voice signal corresponding to the voice command using the voice recognition algorithm in step 610.

In step 612, the electronic device 100 performs the corresponding operation based on the recognized voice command. For example, when the recognized voice command is "Call Hong Gil-dong", the electronic device 100 searches the phonebook for the phone number of Hong Gil-dong and tries to connect the call with the searched phone number. Thereafter, the process ends.

Figure 7:
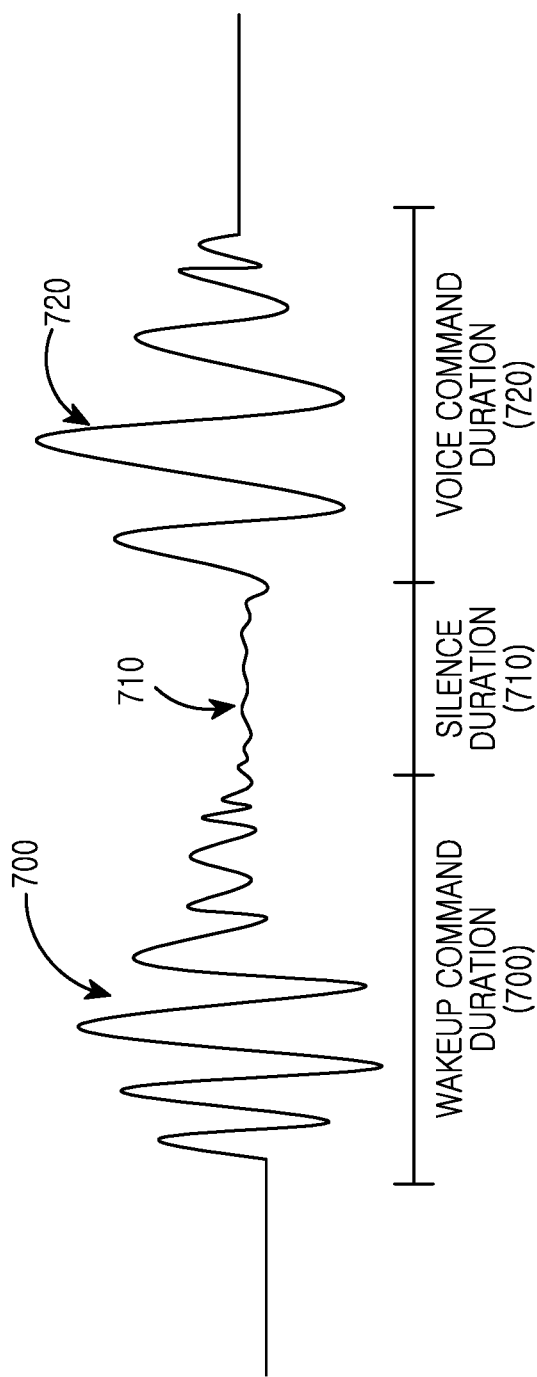
FIG. 7 illustrates a voice signal including a wakeup command and the voice command that may be detected and recognized according to embodiments of the present invention.

FIG. 7 depicts an example voice signal including a wakeup command and a voice command that may be analyzed in the embodiments described above. The illustrative voice signal input to device 100 may contain a wakeup command and a voice command in succession. That is, the voice signal may have a portion 700 corresponding to the wakeup command and a portion 720 corresponding to the voice command, which are successively input to the electronic device. A silence duration portion 720 lies between the wakeup portion 700 and the voice command portion 720.

FIGS. 8A, 8B and 8C are screenshots depicting a dialing operation using the voice signal including the wakeup command and the voice command according to an exemplary embodiment of the present invention. As shown in FIG. 8A, an icon object 800 for recognizing the voice command is activated according to the voice signal portion 700 corresponding to the wakeup command. The voice command ("Call Hong Gil-dong") corresponding to the voice command portion 720 of the voice signal is recognized as shown in FIG. 8B, and then the operation is conducted according to the voice command. For example, the phone number of Hong Gil-dong is searched in the phonebook and the call connection automatically commences with, the searched phone number as shown in FIG. 8C.

Figure 9B:
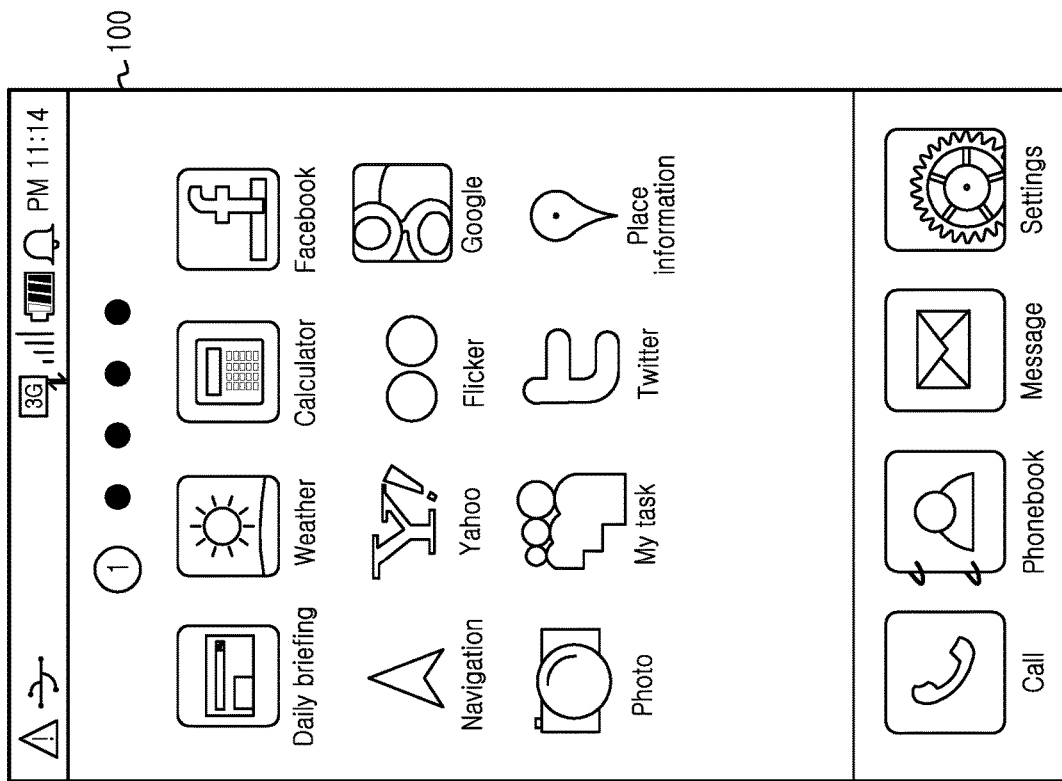
FIG. 9A and FIG. 9B depict screenshots for illustrating a screen unlocked through wakeup command detection according to an exemplary embodiment of the present invention.
Figure 9A:
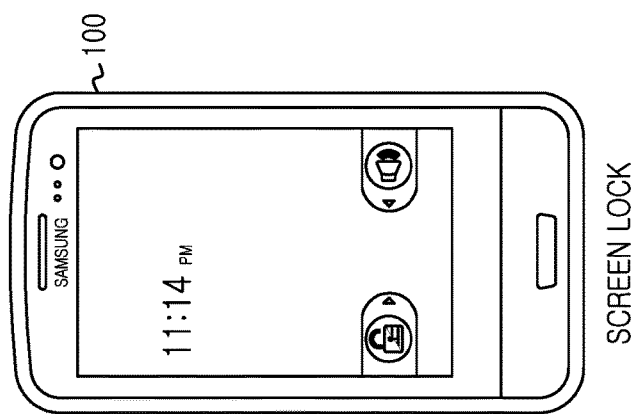

FIGS. 9A and 9B depict screenshots of a screen unlocked through speech recognition and control operations according to an exemplary embodiment of the present invention. FIG. 9A depicts an example lock screen; FIG. 9B shows an example unlocked screen. The process of unlocking the locked screen to generate the unlocked screen as illustrated in FIGS. 9A and 9B can be performed in any of the above-described methods of FIGS. 2, 4 and 6 (e.g., steps 214, 406, 410 or 612).

In response to detection of the wakeup command portion 700 of the voice signal matching a predetermined wakeup command or matching a particular user's voice, the locked screen of FIG. 9A is switched to the unlocked screen of FIG. 9B. Although not depicted, the corresponding operation can be performed by recognizing the voice command portion 720 corresponding to the voice command ("Call Hong Gil-dong") following the voice signal 700 corresponding to the wakeup command after the screen is unlocked.

In the exemplary embodiments of the present invention described above, the wakeup command and the voice command are separated. Alternatively, the voice signal corresponding to the voice command can be used for both of the speaker verification and the voice command. Namely, the speaker is verified with the voice signal corresponding to the voice command. When the speaker verification is successful, the corresponding function of the electronic device can be controlled or executed according to the voice command.

The above-described methods according to the present disclosure can be implemented in hardware or software alone or in combination.

For software, a computer-readable storage medium containing one or more programs (software modules) can be provided. One or more programs stored to the computer-readable storage medium are configured for execution of one or more processors of the electronic device and/or the server. One or more programs include instructions making the electronic device and/or the server execute the methods according to the embodiments as described in the claims and/or the specification of the present disclosure.

Such programs (software module, software) can be stored to a random access memory, a non-volatile memory including a flash memory, a Read Only Memory (ROM), an Electrically Erasable Programmable ROM (EEPROM), a magnetic disc storage device, a Compact Disc ROM (CD-ROM), Digital Versatile Discs (DVDs) or other optical storage devices, and a magnetic cassette. Alternatively, the programs can be stored to a memory combining part or all of those recording media. A plurality of memories may be equipped.

The programs can be stored to an attachable storage device of the electronic device and/or the server accessible via the communication network such as Internet, Intranet, Local Area Network (LAN), Wide LAN (WLAN), or Storage Area Network (SAN), or a communication network by combining the networks. The storage device can access the electronic device and/or the server through an external port.

A separate storage device in the communication network can access the portable electronic device/server.

As set forth above, since the detected voice signal including the wakeup command portion and the voice command portion is processed, the user can easily execute the voice command.

In addition, since the wakeup command detection is fulfilled before the voice command is executed, the voice command can be carried out based on security/personal information protection.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device comprising:
one or more microphones;
communication circuitry;
a display; and
one or more processors, wherein the one or more processors are configured to:
receive a voice signal including wakeup command and a voice command subsequent to the wakeup command through the one or more microphones while displaying a lock screen on the display,
recognize the wakeup command in the voice signal,
in response to recognizing the wakeup command in the voice signal, change the lock screen to a screen for a voice command function including a visual object related to voice recognition, the visual object being indicative of the voice command function being activated,
transmit a signal including the voice command and not including the wakeup command of the voice signal through the communication circuitry to a server for conducting speech recognition on the voice command,
receive a control signal corresponding to the recognized voice command from the server, and
perform an operation responsive to the control signal.

2. The electronic device of claim 1, wherein the voice signal further includes a duration of silence between the wakeup command and the voice command.

3. The electronic device of claim 1, wherein the wakeup command is pre-determined or is configured with at least one word which a user inputs when a speaker-dependent recognition scheme which is based on information on a voice of the user is used, and the information is acquired from the voice signal, corresponding to the wakeup command, spoken plural times by the user in advance.

4. The electronic device of claim 1, wherein recognizing, changing, transmitting and performing are able to be executed by the one or more processors without a user input after receiving the voice signal including the wakeup command and the voice command.

5. The electronic device of claim 1, wherein the one or more processors are configured to transmit, in response to detecting the voice command after recognizing the wakeup command, the signal through the communication circuitry to the server.

6. The electronic device of claim 1, wherein the wakeup command is recognized based on a first voice recognizing algorithm and the voice command is recognized based on a second voice recognizing algorithm by the server.

7. A computer program product comprising one or more non-transitory computer readable storage media having a computer readable program stored therein, wherein the computer readable program, when executed on an electronic device, causes the electronic device to:
receive a voice signal including a wakeup command and a voice command subsequent to the wakeup command from a user;
recognize the wakeup command while a lock screen is displayed on a touch screen of the electronic device;
in response to recognizing the wakeup command in the voice signal, change the lock screen to a screen for a voice command function including a visual object related to voice recognition, the visual object being indicative of the voice command function being activated;
transmit a signal including the voice command and not including the wakeup command of the voice signal to a server for conducting speech recognition on the voice command and obtaining a recognized voice command at the server;
receive a control signal corresponding to the recognized voice command from the server; and
perform an operation in response to the control signal.

8. The electronic device of claim 7, wherein the voice signal further includes a duration of silence between the wakeup command and the voice command.

9. The computer program product of claim 7, wherein the computer readable program, when executed the electronic device, causes the electronic device to execute a particular application in response to the control signal.

10. The computer program product of claim 7, wherein the computer readable program, when executed the electronic device, causes the electronic device to display data corresponding to the voice command in response to the control signal.

11. The computer program product of claim 7, wherein the computer readable program, when executed the electronic device, causes the electronic device to display a graphical user interface (GUI) related to the voice command.

12. The computer program product of claim 7, wherein the computer readable program, when executed the electronic device, causes the electronic device to recognize a predetermined speaker of the voice signal based on the wakeup command.

13. The computer program product of claim 12, wherein the computer readable program, when executed the electronic device, causes the electronic device to unlock the touch screen in response to recognizing the predetermined speaker of the voice signal.

14. The computer program product of claim 7, wherein the voice signal is input through a microphone of the electronic device in an idle mode, and when the wakeup command is detected in the idle mode, a voice command mode is activated.

15. The electronic device of claim 7, wherein the wakeup command is pre-determined or is configured with at least one word which a user inputs when a speaker-dependent recognition scheme which is based on information on a voice of the user is used, and the information is acquired from the voice signal, corresponding to the wakeup command, spoken plural times by the user in advance.

16. The electronic device of claim 7, wherein the computer readable program, when executed the electronic device, causes the electronic device to transmit, in response to detecting the voice command after recognizing the wakeup command, the signal to the server.

17. The electronic device of claim 7, wherein the wakeup command is recognized based on a first voice recognizing algorithm and the voice command is recognized based on a second voice recognizing algorithm by the server.

\* \* \* \* \*